United States Patent
Trowbridge et al.

(10) Patent No.: US 12,434,511 B2
(45) Date of Patent: Oct. 7, 2025

(54) TIRE SIPE FOR HEAVY TRUCK TREAD HAVING HANDLEBAR SHAPE

(71) Applicant: COMPAGNIE GENERALE DES ETABLISSEMENTS MICHELIN, Clermont-Ferrand (FR)

(72) Inventors: Jeremy David Trowbridge, Greenville, SC (US); Victor Abarotin, Greer, SC (US); Arthur Rade, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 18 days.

(21) Appl. No.: 18/553,762

(22) PCT Filed: Jun. 10, 2021

(86) PCT No.: PCT/US2021/036820
§ 371 (c)(1),
(2) Date: Oct. 3, 2023

(87) PCT Pub. No.: WO2022/260674
PCT Pub. Date: Dec. 15, 2022

(65) Prior Publication Data
US 2024/0181814 A1 Jun. 6, 2024

(51) Int. Cl.
*B60C 11/12* (2006.01)
*B60C 11/03* (2006.01)

(52) U.S. Cl.
CPC ...... *B60C 11/1218* (2013.01); *B60C 11/1263* (2013.01); *B60C 11/1281* (2013.01);
(Continued)

(58) Field of Classification Search
CPC ............. B60C 11/1281; B60C 11/1263; B60C 11/1218; B60C 2011/1213; B60C 2011/0348; B60C 2011/0397
See application file for complete search history.

(56) References Cited

U.S. PATENT DOCUMENTS

2012/0234443 A1* 9/2012 Kurokawa .......... B60C 11/1281
152/209.18
2014/0166173 A1 6/2014 Dayet et al.
(Continued)

FOREIGN PATENT DOCUMENTS

EP 3415343 B1 2/2020
JP 61-159203 U * 10/1986
(Continued)

OTHER PUBLICATIONS

Machine translation for Japan 2008-279865 (Year: 2024).*
(Continued)

*Primary Examiner* — Steven D Maki
(74) *Attorney, Agent, or Firm* — Neal P. Pierotti

(57) ABSTRACT

A heavy truck tire tread that has a rib is provided. A sipe is in the rib that extends from a first lateral surface to a second lateral surface. A first end of a teardrop is located at the first lateral surface, and a second end at the second lateral surface. A middle section of the teardrop is located between the first and second ends in the lateral direction. A first transition is located between the first end and the middle section, and a second transition is located between the second end and the middle section and they both extend in the lateral and thickness directions. The entire middle section is farther from the upper surface in the thickness direction than any portion of the first or second ends are to the upper surface in the thickness direction.

11 Claims, 13 Drawing Sheets

(52) U.S. Cl.
CPC ............... *B60C 2011/0348* (2013.01); *B60C 2011/0397* (2013.01); *B60C 2011/1213* (2013.01); *B60C 2200/06* (2013.01)

(56) References Cited

U.S. PATENT DOCUMENTS

| | | | |
|---|---|---|---|
| 2019/0329598 A1* | 10/2019 | Park | B60C 11/0323 |
| 2023/0084725 A1* | 3/2023 | Voss | B60C 11/1281 |
| | | | 152/209.18 |
| 2024/0066822 A1* | 2/2024 | Ishihara | B29D 30/0606 |

FOREIGN PATENT DOCUMENTS

| | | | |
|---|---|---|---|
| JP | 01-101205 A | * | 4/1989 |
| JP | 2005193815 A | | 7/2005 |
| JP | 2008-279865 A | * | 11/2008 |
| KR | 101037410 B1 | * | 5/2011 |
| KR | 101411093 B1 | * | 7/2014 |
| WO | WO-2019108173 A1 | * | 6/2019 |

OTHER PUBLICATIONS

Machine translation for Japan 01-101205 (Year: 2024).*
Partial machine translation for Japan 01-101205 (Year: 2024).*
Partial translation for Japan 61-159203 U (Year: 2024).*
Machine translation for Japan 61-159203 U (Year: 2024).*
Machine translation for Korea 101037410 (Year: 2024).*
Machine translation for Korea 101411093 (Year: 2024).*
European Patent Office, International Search Report and Written Opinion dated Mar. 2, 2022 pp. 1-09 (included), European Patent Office, Rijswijk, The Netherlands.

* cited by examiner

TIRE SIPE FOR HEAVY TRUCK TREAD HAVING HANDLEBAR SHAPE

CROSS-REFERENCE TO RELATED APPLICATIONS

The present application is a 35 U.S.C. § 371 application of PCT/US2021/036820 filed on Jun. 10, 2021 and entitled "Tire Sipe for Heavy Truck Tread Having Handlebar Shape" and claims benefit thereto. The entire contents of PCT/US2021/036820 are incorporated by reference herein in their entirety for all purposes.

FIELD OF THE INVENTION

The subject matter of the present invention relates to sipes for tires that feature a teardrop that has a certain geometry that minimizes or eliminates cracking in the teardrop. More particularly, the present application involves a sipe in a rib with a teardrop that has a middle section farther from the upper surface than the ends of the teardrop are to the upper surface so that cracking is minimized or reduced while achieving a compromise with rolling resistance and end of service traction.

BACKGROUND OF THE INVENTION

Tires normally include tread that has a series of ribs that extend in a circumferential direction of the tire separated in the axial direction by grooves. The ribs can be provided with a series of sipes that function to improve traction in certain road conditions. The sipes are thin slits cut into the ribs and can be made in a variety of manners. For instance, the shape along the lengths of the sipes may be straight, zig-zag, undulating, or angled into the tire elements. The sipe depths may also vary or be consistent along their lengths, and may extend into the tread all the way to the end of life tread depth. The sipes may close within the tire "footprint" on the road, and can increase the flexibility of the tread block into which the sipes are located. The presence of sipes can improve stopping distance, breakaway traction, and rolling traction on glare ice. Additionally sipes have been found to improve traction for tires in snow, mud, and other types of ice.

It is known to provide sipes with a teardrop shape that tends to increase traction of the tire when the tire is near the end of its life. The teardrop feature in the sipe is an increase in the circumferential length of the sipe at an area of the sipe closer to the center of the tire in the radial direction. This increase in circumferential length causes the sipe to have a larger void radially closer to the tire center than portions of the sipe radially farther from the tire center. When the tire tread wears down, the larger void portion will open up and be exposed to the road surface and will improve traction and water removal when the tire is nearing the end of its life.

Although the inclusion of sipes helps improve tire performance in certain areas, the addition of these cut features into the ribs of the tire may also cause a risk of irregular wear on the ribs, increased rolling resistance, degradation in sculpture robustness, and a risk of increased chipping and chunking. Sipes that are present in shoulder ribs of heavy commercial truck tires may cause irregular wear, increased rolling resistance, and sipe aggression. Sipe aggression is the cracking or breaking of the shoulder rib due to a stress concentration caused by the sipe. When a drive tire experiences torque, cracking in the shoulder rib may occur at the bottom of the teardrop and subsequently extend away from this initiation site.

A known approach to prevent or minimize cracking at the bottom of the teardrop is to make the teardrop larger in size, which would generally mean an increase in the diameter of the teardrop causing it to be larger in the circumferential direction of the tread. Increasing the size of the teardrop radius increases end of service traction, but decreases rigidity in the tread block. This decrease in rigidity is because there is less material making up the tread block so that material between the teardrop and the upper surface is much less rigid. This has a negative impact in that wear performance is reduced, and rolling resistance performance is reduced. Another way of minimizing or eliminating cracking at the bottom of the teardrop is to move the teardrop up in the thickness direction so that it is closer to the upper surface of the tread, thus making the sipe not as deep overall as it otherwise would have been. However, moving the teardrop up closer to the upper surface of the tread decreases end of service traction associated with the sipe. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
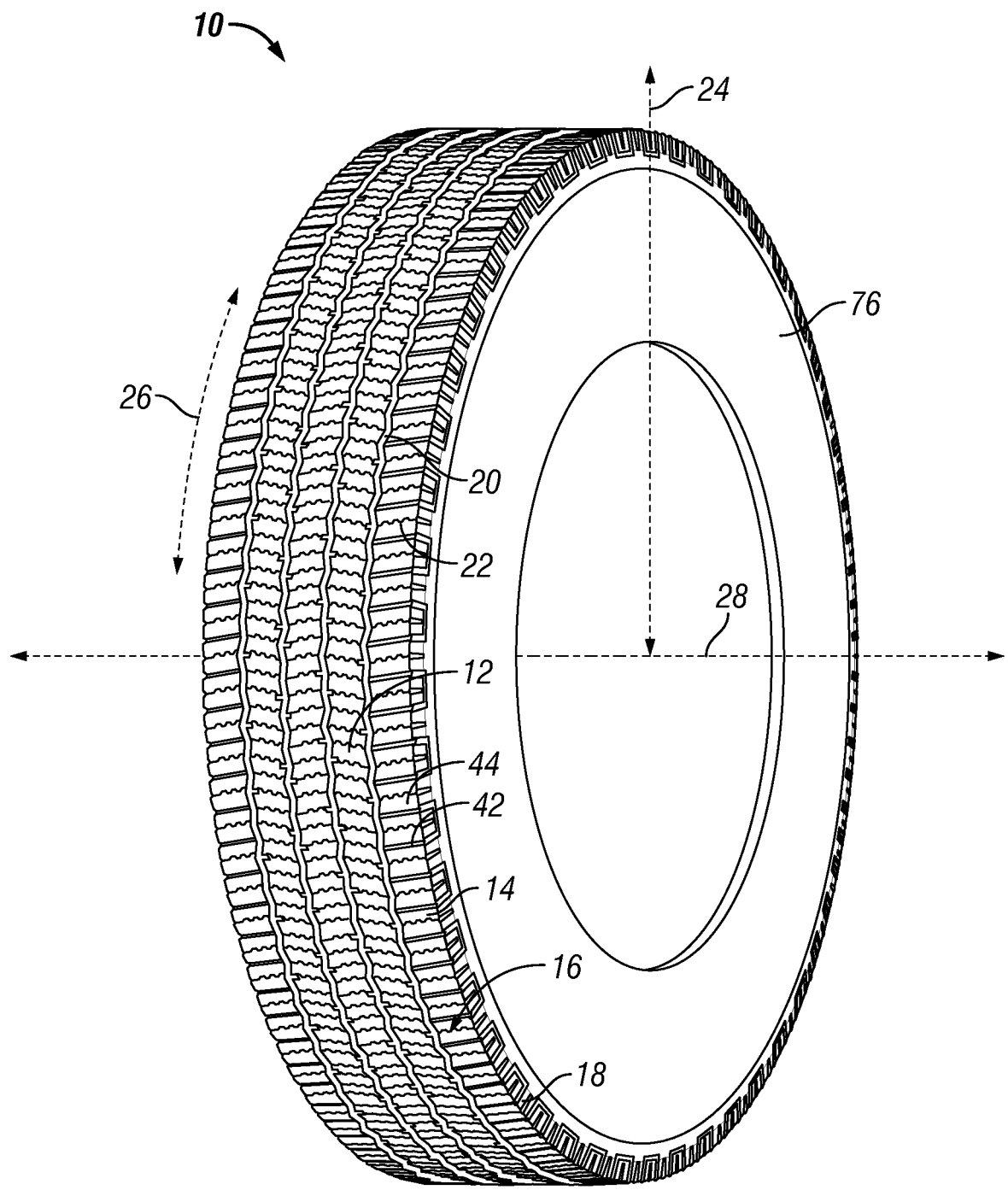
FIG. 1 is a perspective view of a tire with a tread that incorporates sipes in the shoulder as disclosed herein.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a sipe 22 design for a tread 12 of a heavy truck tire 10 that reduces or eliminates crack propagation while at the same time maintaining rigidity and end of life performance. The sipe 22 extends from a first lateral surface 18 to a second lateral surface 19 and has a teardrop 32 with a first end 34 at the first lateral surface 18 and a second end 36 at the second lateral surface 19. The middle section 38 of the teardrop 32 is located farther from the upper surface 16 in the thickness direction 24 than are the ends 34, 36. First and second transitions 90, 92 of the teardrop 32 are located between the middle section 38 and the ends 34, 36. The transitions 90, 92 establish a geometric change to the shape of the teardrop 32 that reduces or eliminates crack propagation from the middle section 38 to the ends 34, 36. In some versions of the teardrop 32, the provided geometric shape may also reduce or eliminate crack initiation in the middle section 38 where crack initiation is most likely to occur. With the geometric change established by the transitions 90, 92, the overall depth of the sipe 22 in the thickness direction 24 does not need to be moved up to the upper surface 16, and the cross-sectional size of the teardrop 32 along its entire length does not need to be increased.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. In a preferred embodiment, the tire 10 that includes the sipe 22 as used herein is a drive tire of a tractor of a tractor trailer. The tire 10 includes a casing/carcass 76 onto which a tread 12 is disposed thereon. The central axis of the tire 10 extends through the center of the carcass 76, and the lateral/axial direction 28 of the tire 10 is parallel to the central axis. The radial direction 24, which is also known as the thickness direction 24, of the tire 10 is perpendicular to the central axis, and the tread 12 is located farther from the central axis in the thickness direction 24 than the carcass 76. The tread 12 extends all the way around the carcass 76 in the circumferential direction 26 of the tire 10 and circles the central axis 360 degrees.

The tread 12 features five ribs that are separated by four longitudinal grooves that extend in the circumferential direction 26. The five ribs can be classified as a central rib, two intermediate ribs, and two shoulder ribs one of which is marked as shoulder rib 14. The shoulder rib 14 is located on one side of the tread 12 in the lateral direction 28, and the second shoulder rib is located on an opposite side of the tread 12 in the lateral direction 28. A first lateral surface 18 of the shoulder rib 14 is present at the first shoulder rib 14 and is the outer most surface of the tread 12 in the lateral direction 28. The ribs can each be made up of a number of tread blocks, the blocks in the shoulder rib 14 being identified as shoulder rib blocks 44, that can have various shapes, sizes, and structural features to cause the tread 12 to have different performance properties. Rib grooves 42 separate the shoulder rib blocks 44 along the length of the shoulder rib 14 in the circumferential direction 26. The rib grooves 42 may have a width that is greater than 2 millimeters. Although composed of a series of shoulder rib blocks 44, the shoulder rib 14 need not have any shoulder rib blocks 44 in other embodiments.

The tread 12 may include certain structural features that can reduce tearing or crack initiation and propagation. One such structural feature shown with reference to FIG. 2 may be sipes 22 that extend across the entire lateral width of the shoulder rib 14 in the lateral direction 28. The sipes 22 are thin grooves/cuts in the shoulder rib 14. The sipes 22 at the upper surface 16 of the shoulder rib 14 may have widths that are two millimeters or less. The sipe 22 has a body 30 that extends from the upper surface 16 down into the shoulder rib 14 in the thickness direction 24, and the body 30 has a width that is less than 2 millimeters. At the bottom of the body 30, a teardrop 32 is included in the sipe 22. The teardrop 32 may be less than two millimeters or may be greater than or equal to two millimeters in cross-sectional size or diameter.

The sipes 22 are shown and described as being within the shoulder rib 14, but this is but one embodiment as the sipes 22 as described herein could be in any one or more of the shoulder ribs, intermediate ribs, or center ribs, or any rib of the tread 12. The rib can thus be the shoulder rib 14, the intermediate rib, the center rib, or any rib of the tread 12. When the rib is the shoulder rib 14, the first lateral surface 18 is an outer lateral surface of the tread 14, and the second lateral surface 19 is a surface of the shoulder rib 14 that faces the shoulder groove 20 and could be said to define a portion of the shoulder groove 20.

Figure 2:
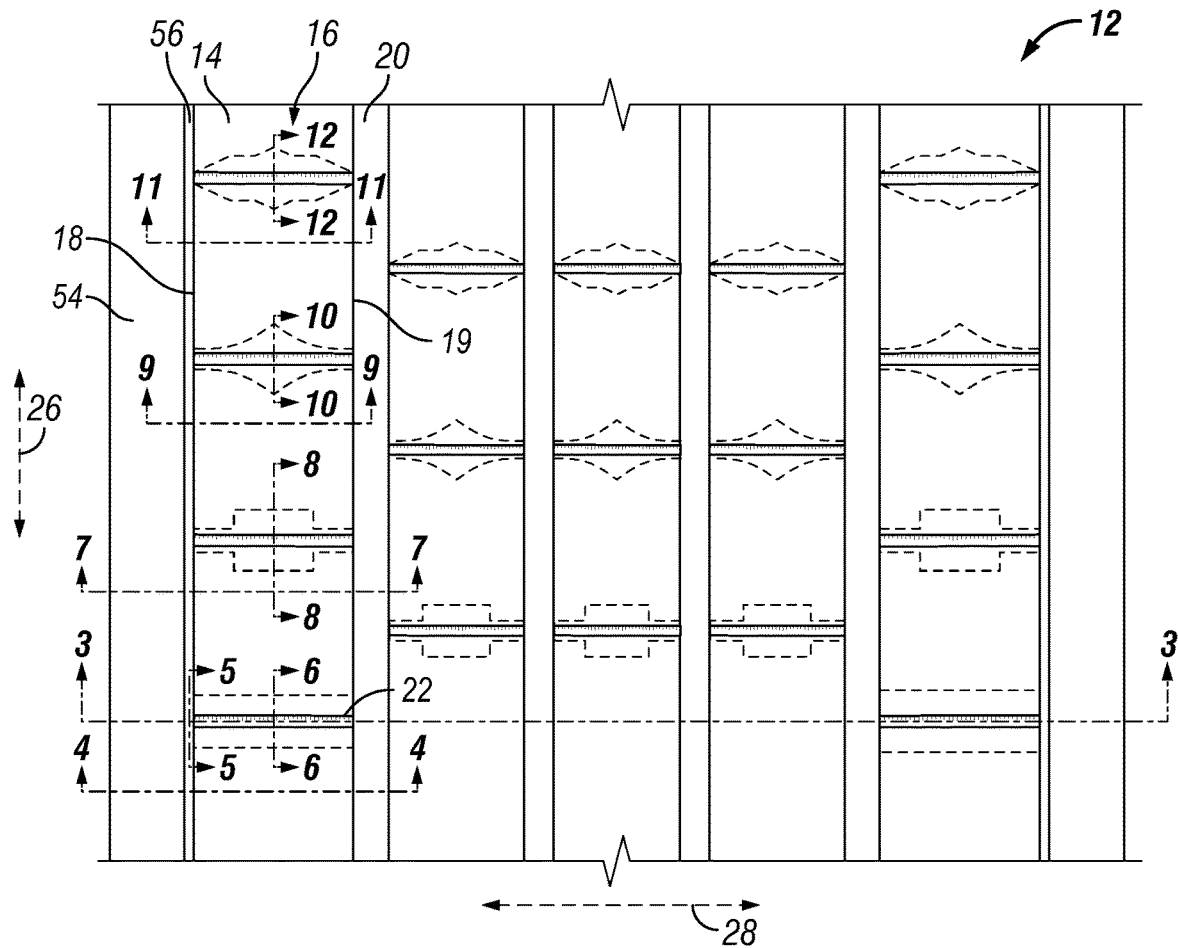
FIG. 2 is a top view of tread that includes sipes in the shoulder in which four differently configured sipes are present.
Figure 3:
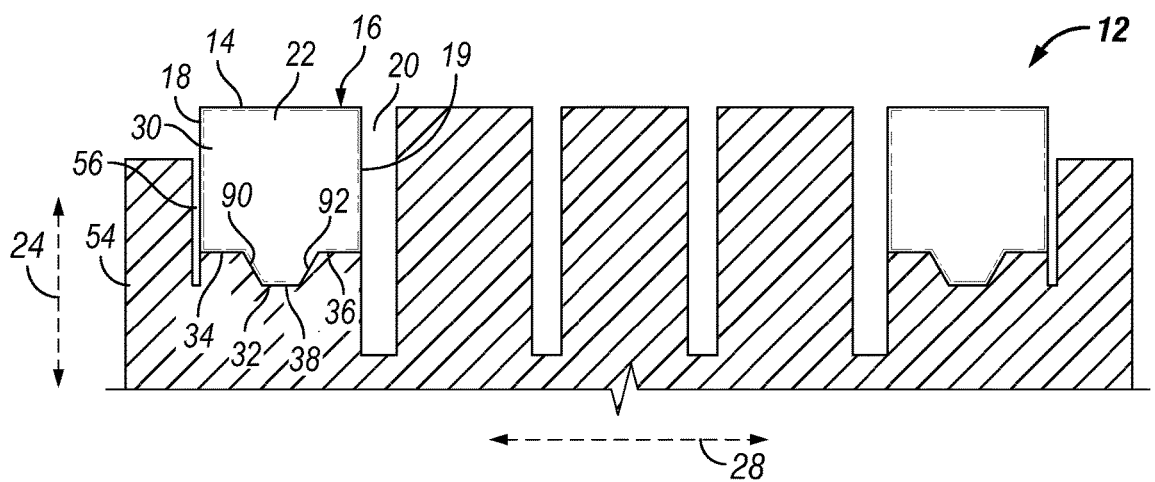
FIG. 3 is a cross-section view taken along line 3-3 of FIG. 2.

FIG. 2 shows four sipes 22 in the shoulder rib 14, and four sipes 22 in the oppositely disposed shoulder rib on the other side of the tread 12 in the lateral direction 28. Various sipes 22 are also located in the two center ribs and the two intermediate ribs. The sipes 22 could all be configured as having the same size and geometry, or they may be of different sizes and/or geometries. In FIG. 2, four of the sipes 22 on the shoulder rib 14 all have different geometries from one another. The sipes 22 on the oppositely disposed shoulder rib are the same geometric configuration as the ones positioned at the shoulder rib 14 at the same location relative to the circumferential direction 26. Any number of sipes 22 can be present in the tread 12 in accordance with various exemplary embodiments, and the left hand shoulder rib 14 may or may not have the same number of sipes 22 as the right hand shoulder rib. It should be noted that the shoulder rib 14 is not at the lateral outboard of the tread 12 in the lateral direction 28, but instead a sacrificial rib 54 is outboard of the shoulder rib 14 in the lateral direction 28. A sacrificial rib groove 56 separates the sacrificial rib 54 from the shoulder rib 14, and the sacrificial rib 54 is designed to protect the shoulder rib 14 from abnormal wear during use of the tread 12. As shown in FIG. 3, the sacrificial rib 54 does not extend in the thickness direction 24 to the same location as the upper surface 16 in the thickness direction 24.

The sipes 22 as described herein are not those that may or may not be in the sacrificial rib 54, but are those that are within the shoulder rib 14 that is distinguished from the sacrificial rib 54 and that is distinguished from center, intermediate, or other ribs of the tread 12. In some embodiments, the sacrificial rib 54 has a height that extends in the thickness direction 24 so that its upper surface is at the same height as the upper surface 16 in the thickness direction 24. It is to be understood that when used herein, the term shoulder rib 14 does not include a sacrificial rib 54 of the tread 12 if such sacrificial rib 54 is in fact present in the tread 12.

Figure 4:
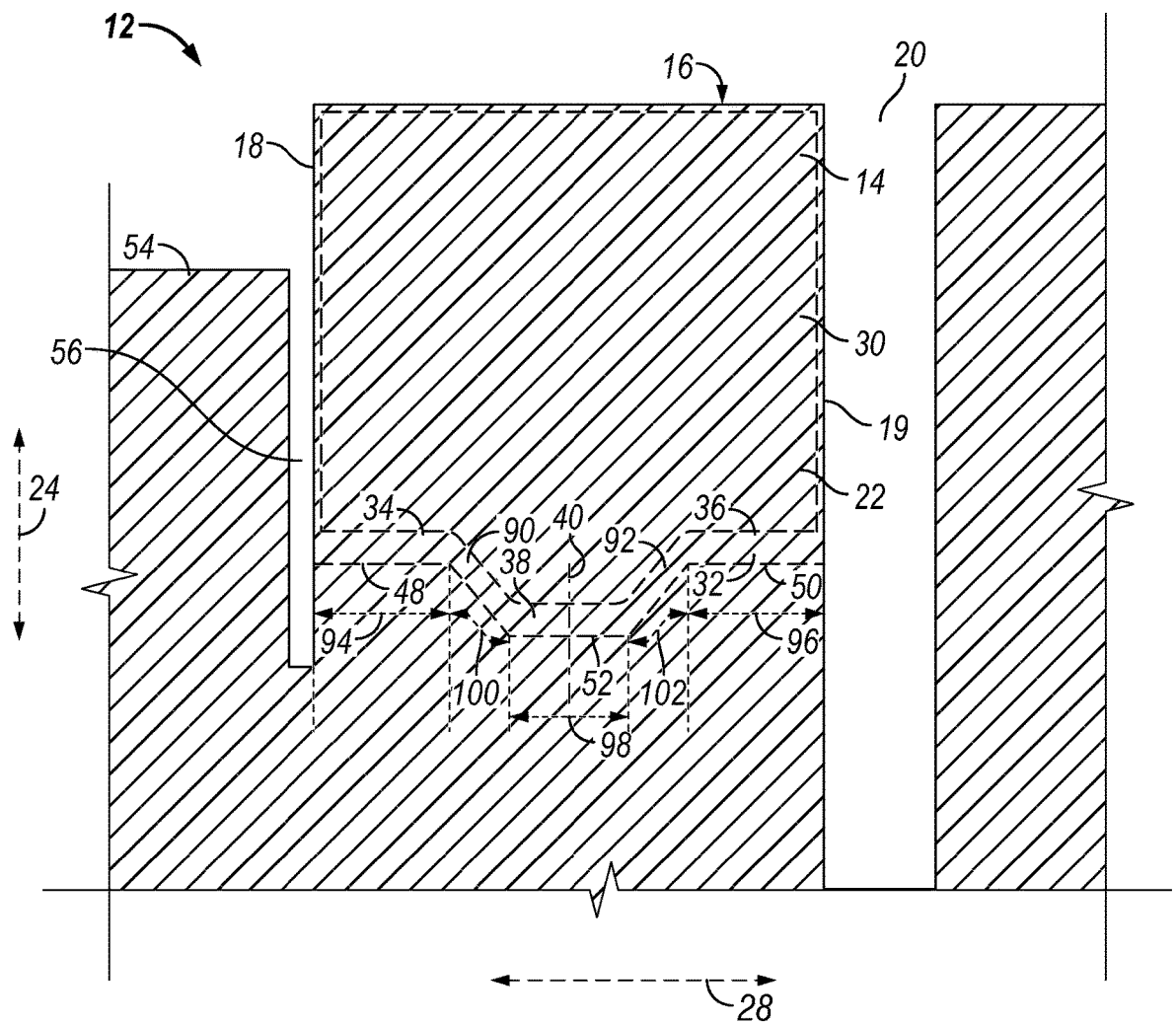
FIG. 4 is a cross-section view taken along line 4-4 of FIG. 2.
Figure 5:
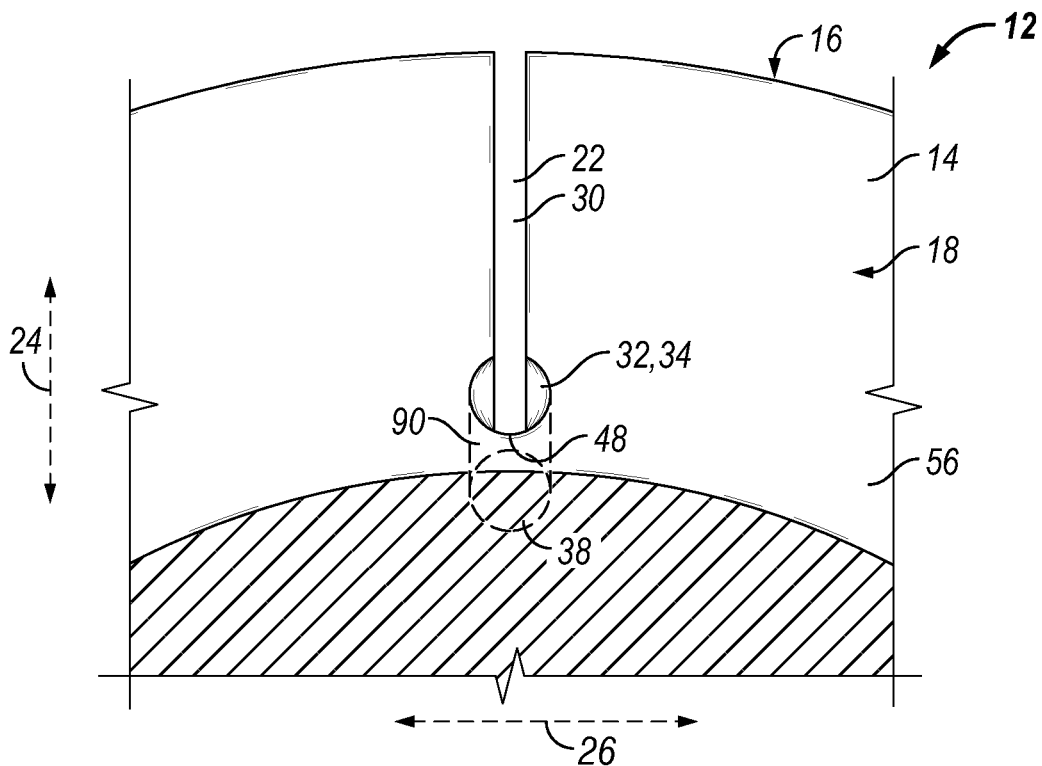
FIG. 5 is a cross-section view taken along line 5-5 of FIG. 2.

FIGS. 3-6 illustrate one configuration of the sipe 22 as disclosed herein. The sipe 22 opens into the sacrificial rib groove 56 and extends all the way to the shoulder groove 20 which is from the first lateral surface 18 to the second lateral surface 19. As can be seen with reference in particular to FIG. 4, the teardrop 32 is composed of a number of sections that render the overall side view shape of the teardrop 32 to that of a handlebar. The body 30 extends along the entire length of the teardrop 32 in the lateral direction 28 and opens into the teardrop 32 along this entire length and extends all the way up to the upper surface 16. The cross-sectional shape of the teardrop 32 is circular and has the same diameter along its entire length in the lateral direction 28. FIG. 5 shows the first end 34 of the teardrop 32 as taken from inside of the sacrificial rib groove 56. The first end 34 is located higher in the thickness direction 24 than the bottom of the sacrificial rib groove 56 such that the bottom of the sacrificial rib groove 56 is farther from the upper surface 16 in the thickness direction 24 than the first end 34 is to the upper surface 16 in the thickness direction 24. The first end 34 is located on the first lateral surface 18 of the shoulder rib 14 along with the body 30. The first end 34 is circular in cross-sectional shape and has the same diameter along its entire length in the lateral direction 28. The first end 34 is located in the same position in the thickness direction 24 along its entire length and does not move closer or farther from the upper surface 16 in the thickness direction 24 at any point along its extension in the lateral direction 28. As shown, another portion of the teardrop 32 referred to as the middle section 38 is located farther from the upper surface 16 in the thickness direction 24 than the first end 34 is to the upper surface 16 in the thickness direction 24. In this regard, the entire middle section 38 is farther from the upper surface 16 such that no portion of the first end 34 is at the same position in the thickness direction 24 as any portion of the middle section 38. The middle section 38 is located in the thickness direction 24 so as to be partially above and partially below the bottom of the sacrificial rib groove 56 in the thickness direction.

With reference back to FIG. 4, the first end 34 has a length 94 in the lateral direction 28, extending from the first lateral surface 18 to a first transition 90. A first end farthest point of extension 48 is noted in FIG. 4 and represents the farthest point of the first end 34 from the upper surface 16 in the thickness direction 24. The first end farthest point of extension 48 extends along the entire length 94 because the first end 34 does not move up or down in the thickness direction 24 upon extension in the lateral direction 28. The middle section 38 has a middle section farthest point of extension 52 that is likewise the location of the middle section 38 that is farthest from the upper surface 16 in the thickness direction 24. As the middle section 38 does not extend upwards or downwards, the middle section farthest point of extension 52 extends along the entire length 98 of the middle section 38 in the lateral direction 28. As shown with reference to FIG. 6, the cross-section of the middle section 38 is circular and has the same diameter along the entire length 98. The lengths 98 and 94 may be the same, or they can be different in various embodiments. The middle section farthest point of extension 52 is farther from the upper surface 16 than the first end farthest point of extension 48 is to the upper surface 16 in the thickness direction 24. The middle section 38 and the first end 34 can have the same diameter.

A first transition 90 shown in FIG. 4 of the teardrop 32 extends from the middle section 38 to the first end 34 and connects these two portions 38, 34 of the teardrop 32. The first transition 90 extends in both the thickness direction 24 and the lateral direction 28, and has a circular cross-section that is the same diameter as the diameter of the first end 34 and the middle section 38. The first transition 90 has a length 100 that extends from the first end 34 to the middle section 38, and the first transition 90 has the circular cross-section along its entire length 100. The length 100 may be the same distance as lengths 94 and 98, or can be longer or shorter than the lengths 94, 98. With respect to the thickness direction 24, the first transition 90 has portions that are at the same position as the first end 34, the middle section 38, and are in between these two portions 34, 38 of the teardrop 32.

The teardrop 32 has a second end 36 at the second lateral surface 19 that opens into the shoulder groove 20 and has a length 96 in the lateral direction 28. The second end 36 has a circular cross-section and is the same diameter along its entire length 96 so that a second end farthest point of extension 50 is located at the second end 36 and extends along the entire length 96. The second end farthest point of extension 50 is the location of the second end 36 farthest from the upper surface 16 in the thickness direction 24. The second end farthest point of extension 50 may be the same location as the first end farthest point of extension 48 relative to the upper surface 16 in the thickness direction 24, and may be closer to the upper surface 16 in the thickness direction than the middle section farthest point of extension 52. The entire second end 36 may be closer to the upper surface 16 than the entire middle section 38 in the thickness direction 24 so that no portion of the middle section 38 is at or above any portion of the second end 36 in the thickness direction 24 so as to be closer to the upper surface 16.

A second transition 92 extends from the middle section 38 to the second end 36 and has components of extension in both the lateral direction 28 and the thickness direction 24. The cross-sectional shape of the second transition 92 is circular, and the diameter of the cross-section of the second transition 92 is the same as the diameter of the second end 36, middle section 38, first end 34, and first transition 90. The second transition 92 has a length 102 that extends from the second end 36 to the middle section 38, and the second transition 92 has the circular cross-section along its entire length 102. The length 102 may be the same distance as lengths 94, 98, 96, and 100, or can be longer or shorter than the lengths 94, 98, 96, 100. With respect to the thickness direction 24, the second transition 92 has portions that are at the same position as the second end 36, the middle section 38, and are in between these two portions 36, 38 of the teardrop 32.

The teardrop 32 is thus provided with a "handlebar" shape when viewed from behind in the circumferential direction 26 as shown for example in FIG. 4. When the sipe 22 first starts to crack, the crack is most likely to begin at the bottom of the teardrop 32 in the middle of the teardrop 32 in the lateral direction 28. A lateral midpoint 40 of the teardrop 32 is located halfway between the terminal ends of the teardrop 32 at the first lateral surface 18 and the shoulder groove 20 in the lateral direction 28. This halfway point is located in the middle section 38, and in some embodiments, the middle section 38 is positioned relative to the lateral midpoint 40 so that one half of the middle section 38 is outboard of the lateral midpoint 40 and so that the other one half of the middle section 38 is inboard of the lateral midpoint 40 in the lateral direction 28. In some embodiments, one half of the entire teardrop 32 is outboard of the lateral midpoint 40 in the lateral direction 28, and one half of the entire teardrop 32 is inboard of the lateral midpoint 40 in the lateral direction 28. The middle section 38 is in the middle of the teardrop 32 in the lateral direction 28, and a crack that begins in the teardrop 32 will begin in the bottom of the middle section 38 at the middle section farthest point of extension 52. The presence of the transitions 100, 102 on either side of the middle section 38 in the lateral direction 28 function to prevent propagation of the crack from the middle section 38 to the ends 34, 36. If the propagation of the crack is stopped, the crack will not be seen by the user to maintain the aesthetic look of the tire 10 tread 12, and will not propagate to further degrade the tread 12 performance.

Figure 7:
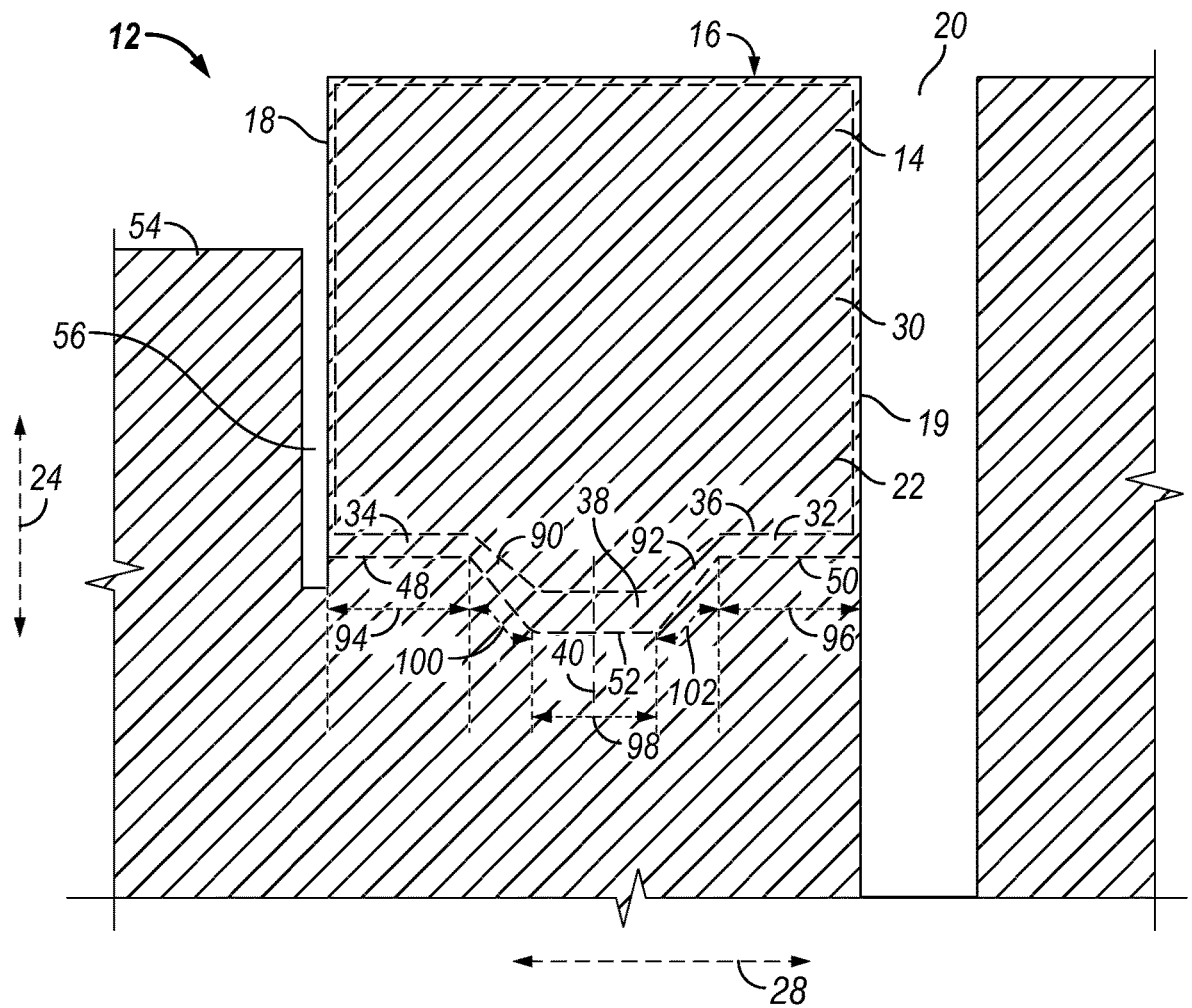
FIG. 7 is a cross-section view taken along line 7-7 of FIG. 2.
Figure 8:
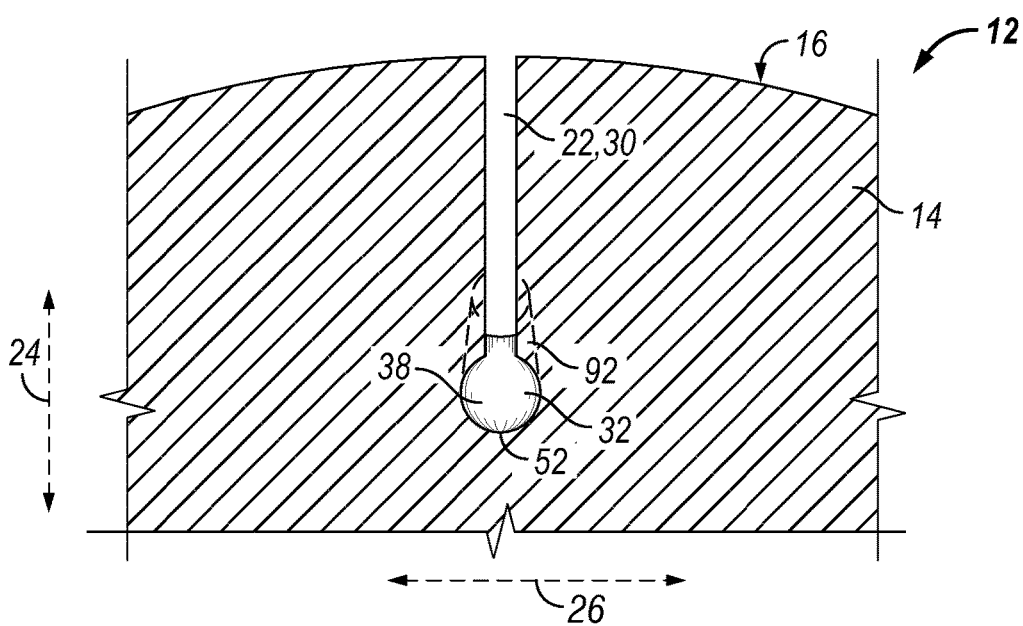
FIG. 8 is a cross-section view taken along line 8-8 of FIG. 2.

A sipe 22 that is configured differently from that just discussed is shown in FIG. 2 and in further detail with reference to FIGS. 7 and 8. The sipe 22 in this configuration again has a handlebar shape in which the middle section 38 is further from the upper surface 16 in the thickness direction 24 than the first and second ends 34, 36 are to the upper surface 16 in the thickness direction 24. The ends 34, 36 are completely located closer to the upper surface 16 in the thickness direction 24 than any portion of the middle section 38 is to the upper surface 16 in the thickness direction 24. The cross-sectional shape of the teardrop 32 is again circular, however the diameter is different in different sections of the teardrop 32. The middle section 38 has a larger diameter cross-section than the cross-sectional diameters of the first end 34 and the second end 36 which are identical to one another. The cross-sections of these portions 38, 34, 36 are constant along their entire widths 98, 94, 96. The first and second transitions 90, 92 have circular cross-sectional shapes in which the diameter of the cross-section decreases in size from the middle section 38 to the ends 34, 36. The farthest points of extension 48, 52, 50 are the same as discussed with respect to the previous embodiment in that they extend along their entire respective lengths 94, 98, 96, and in which the first and second farthest points of extension 48, 50 are at the same distance from the upper surface 16 in the thickness direction 24. The middle section farthest point of extension 52 is again farther from the upper surface 16 in the thickness direction 24 than are the first and second farthest points of extension 48, 50.

Figure 9:
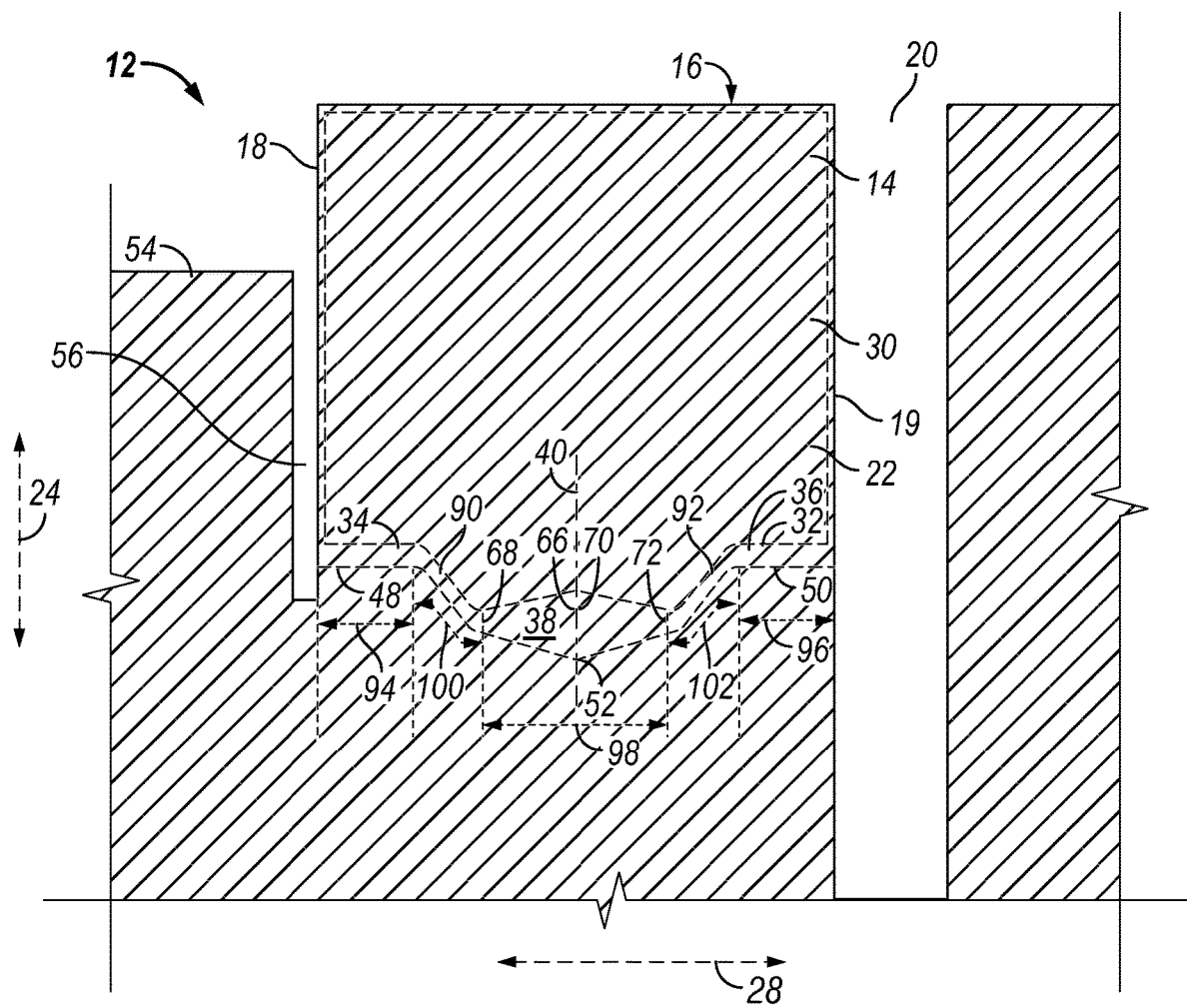
FIG. 9 is a cross-section view taken along line 9-9 of FIG. 2.
Figure 10:
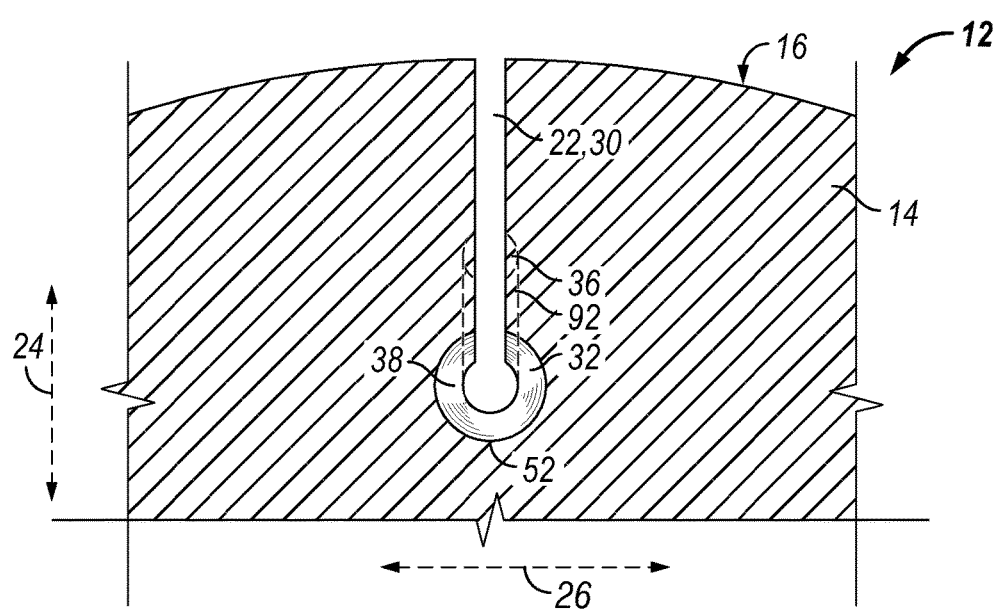
FIG. 10 is a cross-section view taken along line 10-10 of FIG. 2.

The next sipe 22 in sequence in the circumferential direction 26 is shown in cross-sectional view in FIGS. 9 and 10 and has a shape different in geometry than the two previously discussed. The first and second ends 34, 36 are configured in the same manner as the two previously discussed embodiments and a repeat of this information is not necessary. However, the middle section 38 is configured differently in that its cross-sectional size is not uniform along the entire length 98 but instead decreases continuously in size from the lateral midpoint 40 in the lateral direction 28 both inboard and outboard. The middle section 38 has a first middle section base 66 that is located at the lateral midpoint 40, and a first middle section end 68 located at the first transition 90. The shape of the middle section 38 from the first middle section base 66 to the first middle section end 68 is in the shape of a truncated cone in which the cross-section of the middle section 38 decreases continuously in size from the first middle section base 66 to the first middle section end 68 in the lateral direction 28.

The other half of the middle section 38 is a mirror image of the first described half. The second half has a second middle section base 70 that is coincident with the first middle section base 66 and the lateral midpoint 40. The middle section 38 extends from the second middle section base 70 inboard in the lateral direction 28 to a second middle section end 72 that is located at the beginning of the second transition 92. The cross-sectional diameter of the middle section 38 decreases continuously from the second middle section base 70 to the second middle section end 72 in the lateral direction 28. The arrangement of the middle section 38 results in the middle section farthest point of extension 52 being located at the lateral midpoint 40 and thus also at the first middle section base 66 and second middle section base 70. The middle section farthest point of extension 52 is thus at this particular location and does not extend along the entire length 98 as in the previously described embodiments. The first and second middle section ends 68 and 72 are thus closer to the upper surface 16 in the thickness direction 26 than is the middle section farthest point of extension 52. The middle section farthest point of extension 52 is the farthest point the entire teardrop 32 and sipe 22 is from the upper surface 16 in the thickness direction 24.

The point of the middle section 38 closest to the upper surface 16 in the thickness direction 24 is at the lateral midpoint 40, which is also at both the coincident first and second middle section bases 66 and 70. The transitions 90, 92 have cross-sectional diameters that are the same size as the diameters of the ends 34, 36. The middle section 38 extends in the thickness direction 24 so as to be above portions of the transitions 90, 92, but still below the first and second farthest points of extension 48, 50. However, the middle section 38 may extend in the thickness direction 24 to be at or above the first and second farthest points of extension 48, 50 in other embodiments.

Figure 11:
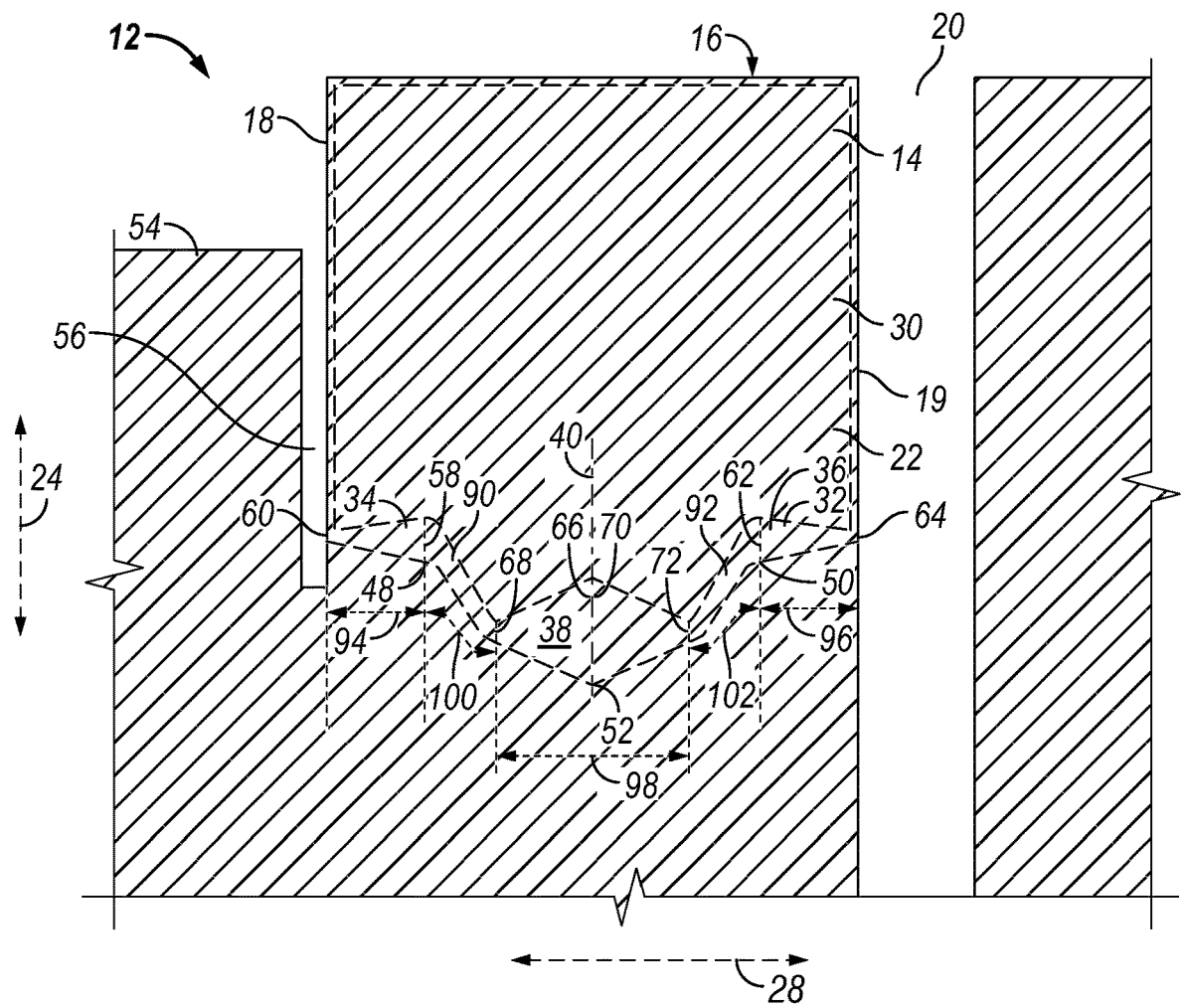
FIG. 11 is a cross-section view taken along line 11-11 of FIG. 2.
Figure 12:
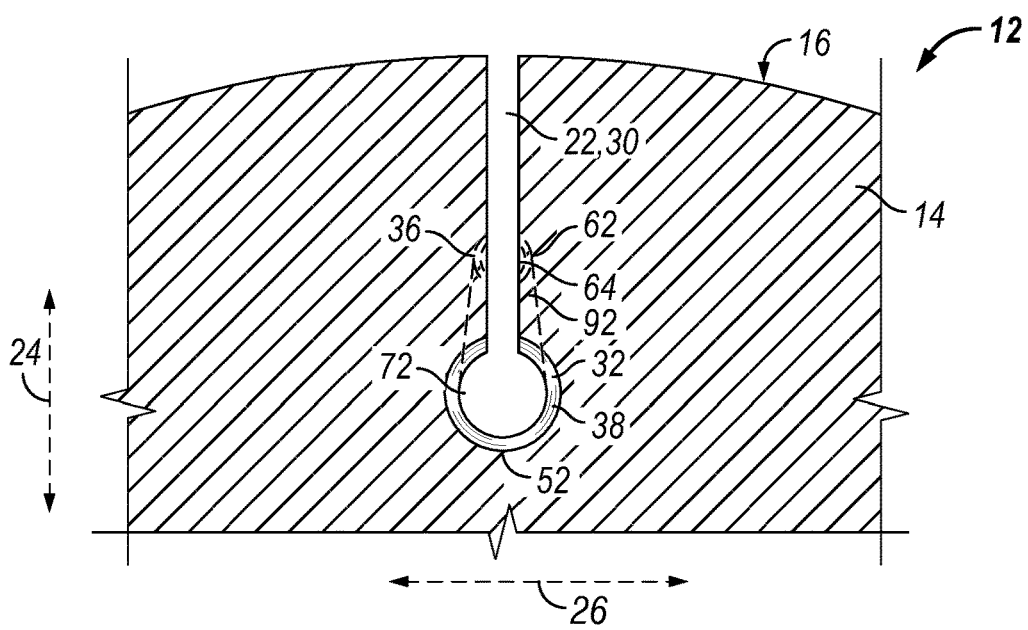
FIG. 12 is a cross-section view taken along line 12-12 of FIG. 2.

The fourth sipe 22 configuration of FIG. 2 is shown in greater detail in the cross-sectional views of FIGS. 11 and 12. The sipe 22 in this configuration has a "cigar" shaped middle section 38 as previously discussed with respect to the sipe 22 described in FIGS. 9 and 10. The middle section farthest point of extension 52 is the farthest point of extension of the teardrop 32 and sipe 22 into the tread 12 and thus the farthest location of the teardrop 32 and sipe 22 from the upper surface 16. The teardrop 32 differs in that the first and second ends 34, 36 are not cylindrical in shape but instead are both in the shape of a truncated cone. In this regard, the first end 34 has a first end base 58 that is located at the first transition 90 and a first end end 60 that is located at the first lateral surface 18. The first end 34 has a circular cross-sectional shape that decreases in diameter continuously from the first end base 58 to the first end end 60 in the lateral direction 28. As such, the first end farthest point of extension 48 is located at the first end base 58 and at the boundary of the first transition 90. The first end farthest point of extension 48 does not extend along the entire length 94 but is instead positioned at the most inboard point of the first end 34.

The second end 36 is configured in a similar manner to the first end 34 such that a second end base 62 is positioned at the second transition 92, and has a greater diameter than a second end end 64 that is at the second lateral surface 19. The second end 36 has the shape of a truncated cone and its diameter decreases continuously in size from the second end base 62 to the second end end 64 in the lateral direction 28.

The second end farthest point of extension 50 is located at the second end base 62 and does not extend along the entire length 96. The smallest cross-sectional diameter of the entire teardrop 32 is located at the first end end 60 and the second end end 64. The cross-sectional size of the first transition 90 does not change in diameter from the first middle section end 68 to the first end base 58 and maintains the same diameter along the entire length 100. In a similar manner, the second transition 92 has a constant diameter along the entire length 102 and is the same diameter as that of the first transition 90. The entire ends 34, 36 are shown as being higher in the thickness direction 24 than the highest point of the middle section 38 which is at the lateral midpoint 40 such that they are closer to the upper surface 16. However, this need not be the case in other embodiments.

Figure 13:
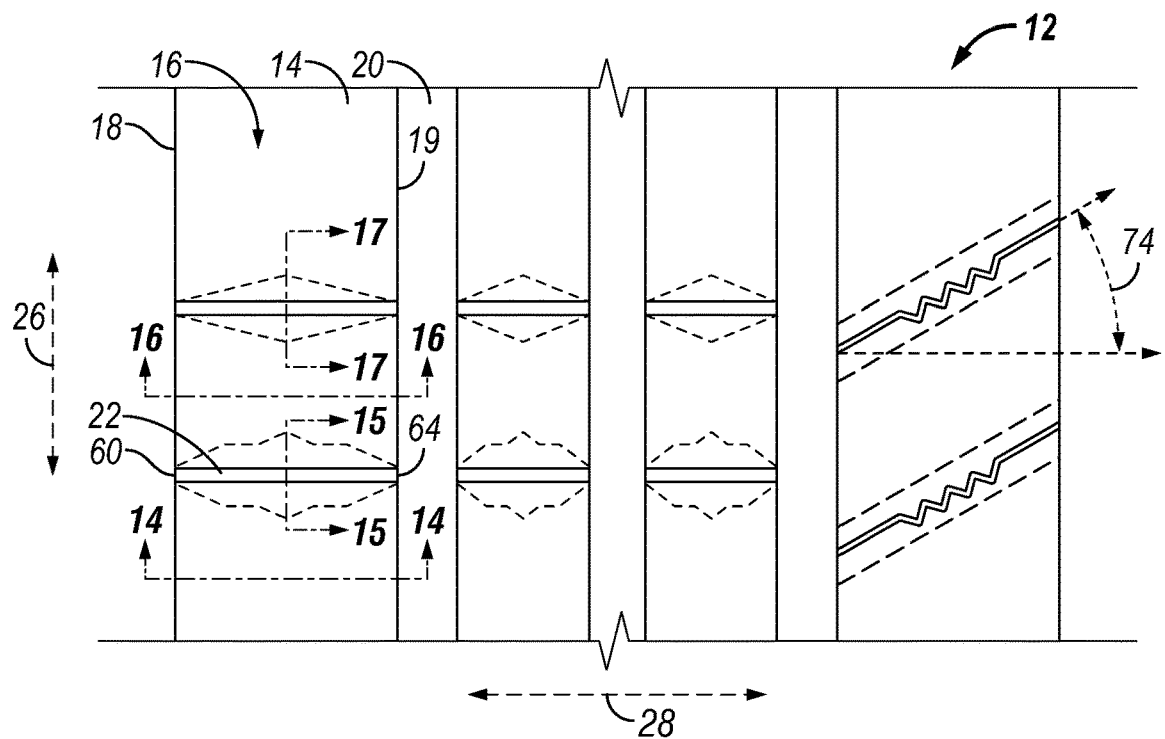
FIG. 13 is a top view of tread with three differently configured sipes in accordance with another exemplary embodiment.

FIG. 13 is a top view of the tread 12 in accordance with another exemplary embodiment in which two differently configured sipes 22 are present in the shoulder rib 14 on the left hand side of the tread 12, and in which a pair of sipes in the right hand side shoulder rib are the same as one another but at an angle 74 to the lateral direction 28. The two center ribs likewise have sipes 22 that are configured the same as the upper sipe 22 in the shoulder rib 14. The tread 12 is different than that shown in FIG. 2 in that a sacrificial rib 54 is not present. Instead, the shoulder rib 14 is the outboard most rib of the tread 12 in the lateral direction 28, and the sipes 22 extend completely from the first lateral surface 18 to the second lateral surface 19 that is at the shoulder groove 20. One of the sipes 22 is shown in the cross-sectional views of FIGS. 14 and 15. The middle section 38 has a shape different than those previously discussed. Here, the first middle section base 66 and first middle section end 68 define half of the middle section 38 that features a cross-sectional shape that is circular and decreases in size in the lateral direction 28 from the first middle section base 66 to the first middle section end 68. The second middle section base 70 is also at the lateral midpoint 40 and the second half of the middle section 38 decreases in diameter continuously from the second middle section base 70 to the second middle section end 72. The middle section farthest point of extension 52 extends along the entire length 98 from the first middle section end 68 to the second middle section end 72. However, the side of the middle section 38 closest to the upper surface 16 in the thickness direction 24 does vary in distance to the upper surface 16. The middle section 38 closest to the upper surface 16 in the thickness direction 24 is located at the lateral midpoint 40 and bases 66, 70. The axes of the circular cross-section of the middle section 38 changes in location in the thickness direction 24 depending upon the location of the middle section 38 in the lateral direction 28 on either side of the lateral midpoint 40.

The ends 34, 36 are likewise configured differently than those disclosed in other embodiments. The first end farthest point of extension 48 and the second end farthest point of extension 50 both extend completely over the lengths 94, 96. However, the opposite sides of the ends 34, 36 which are closest to the upper surface 16 vary in their lengths to the upper surface 16 in the thickness direction 24 in that the first and second end ends 60, 64 are farthest and the first and second end bases 58, 62 are closest. The axes of the first and second ends 34, 36 change in position in the thickness direction 24 depending upon the position of the first and second ends 34, 36 in the lateral direction 28. The transitions 90, 92 have cross-sections that are circular and have the same diameter along their entire lengths 100, 102 such that the diameter at the first and second middle section ends 68, 72 are the same as the diameter at the first and second end bases 58, 62. The cross-section diameter of the teardrop 32 thus decreases, remains the same, and then decreases again upon extension inboard and outboard in the lateral direction 28 from the lateral midpoint 40. The entire ends 34, 36 are closer to the upper surface 16 in the thickness direction 24 than any portion of the middle section 38 is to the upper surface 16 in this direction 24. The first and second end ends 60, 64 are the smallest sections of the entire teardrop 32 as they have the smallest cross-sectional diameter.

Figure 14:
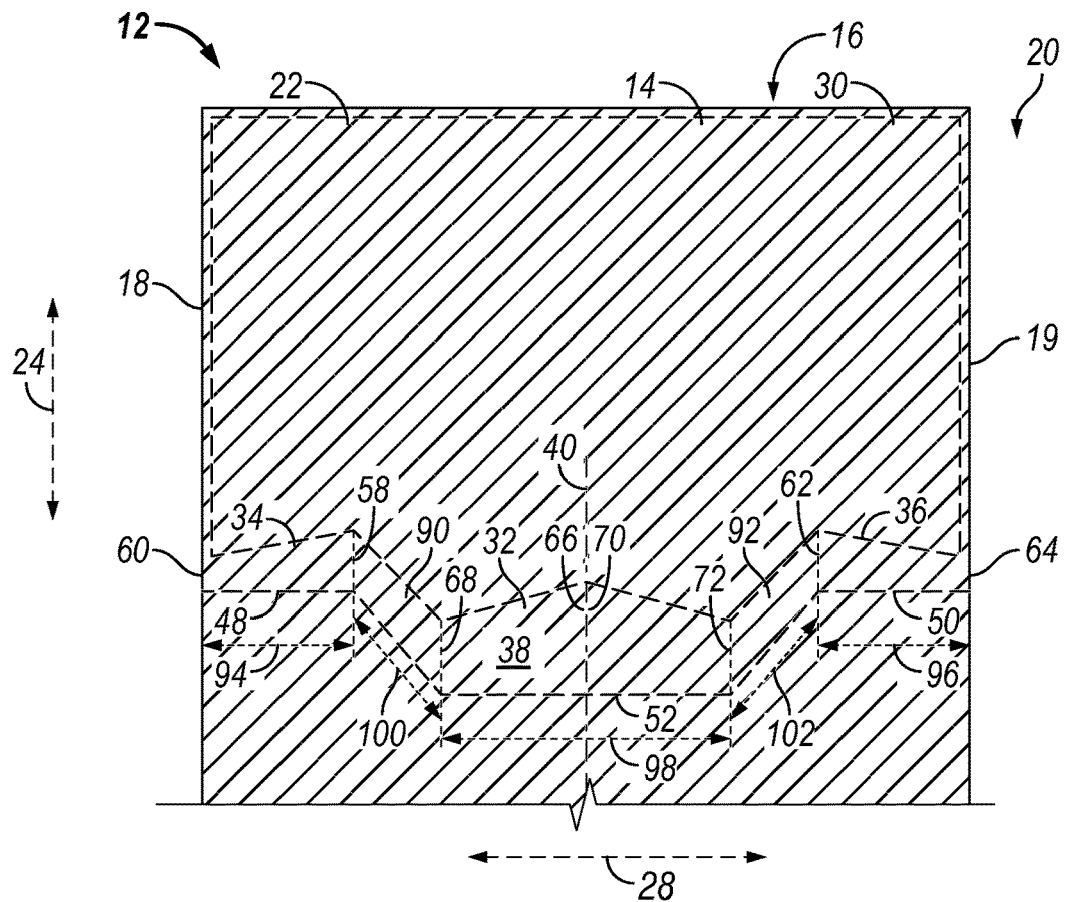
FIG. 14 is a cross-section view taken along line 14-14 of FIG. 13.
Figure 15:
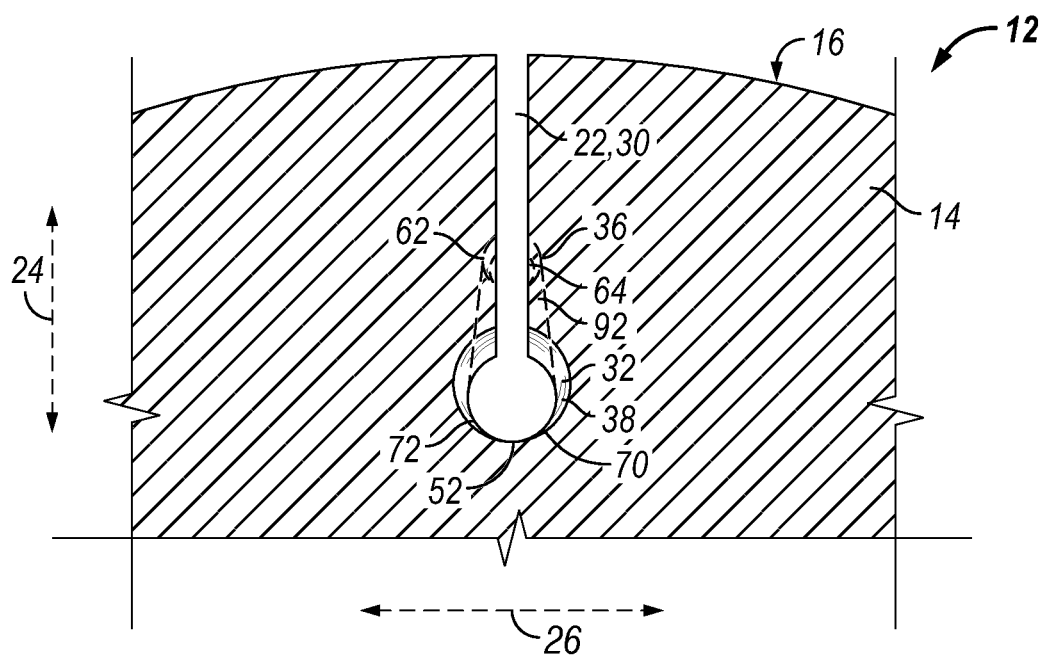
FIG. 15 is a cross-section view taken along line 15-15 of FIG. 13.

FIGS. 14 and 15 show cross-sections through the teardrop 32 and it is to be understood that the bottom of the teardrop 32 has a concave shape and is not a linear line. The teardrop 32 is open in that a continuous void extends all the way from the first lateral surface 18 through the shoulder rib 14 and to the second lateral surface 19 at the shoulder groove 20.

Figure 16:
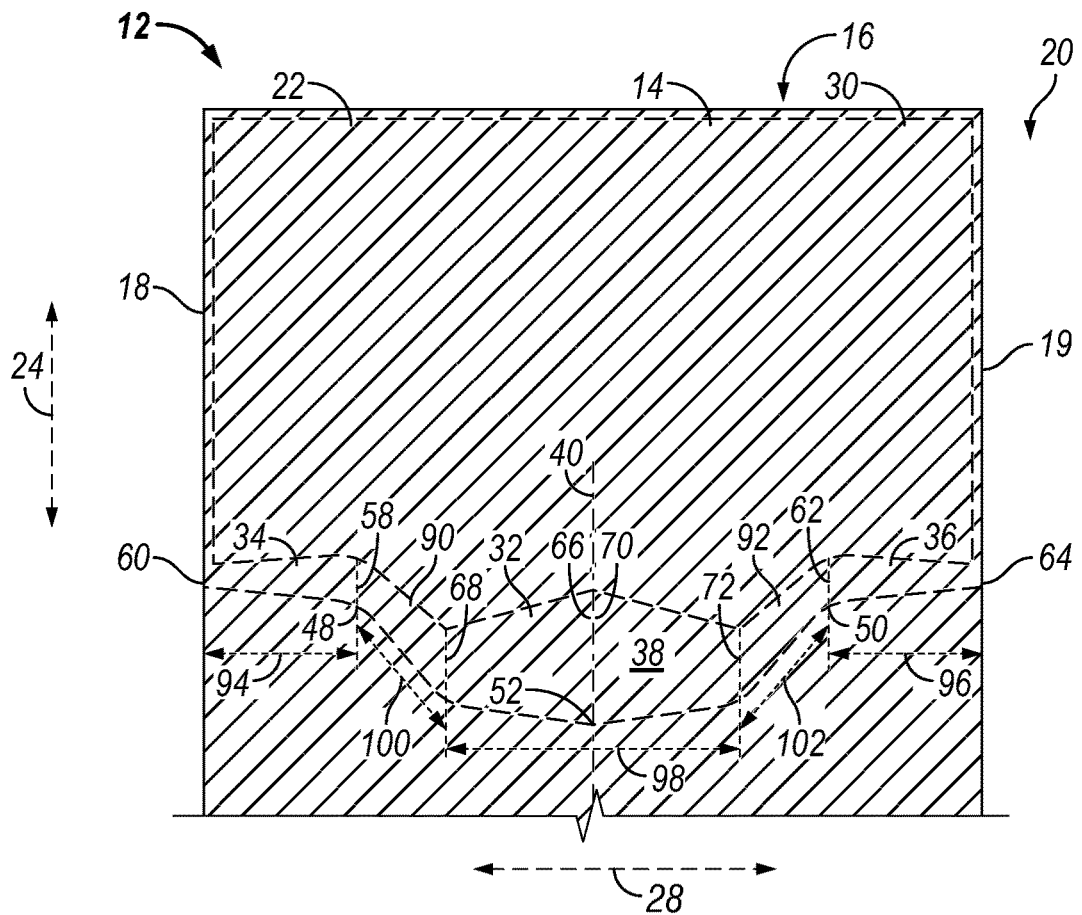
FIG. 16 is a cross-section view taken along line 16-16 of FIG. 13.
Figure 17:
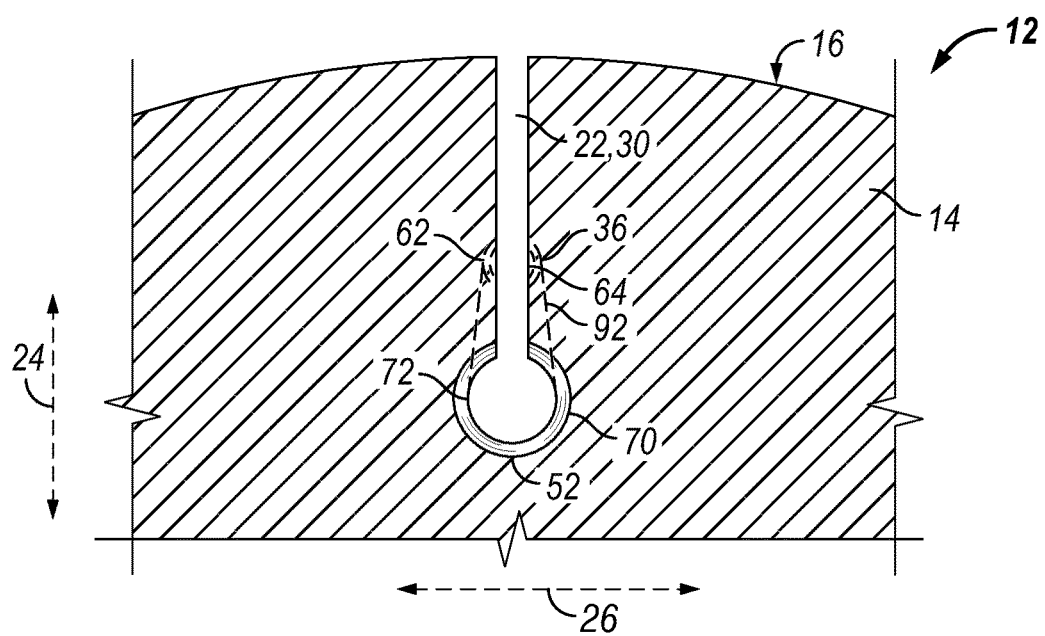
FIG. 17 is a cross-section view taken along line 17-17 of FIG. 13.

The successive sipe 22 in the circumferential direction 26 in FIG. 13 is shown with greater detail in the cross-sectional views of FIGS. 16 and 17 and is configured differently than the sipe 22 immediately discussed. This sipe 22 again extends along the entire lateral width of the shoulder rib 14 so that it opens into the first lateral surface 18 and the second lateral surface 19. The teardrop 32 is again handlebar shaped but is configured differently than any of those previously discussed. As shown, the teardrop 32 has a lateral midpoint 40 such that half of the middle section 38 is inboard and half is outboard in the lateral direction 28. The teardrop 32 is arranged so that it constantly decreases in cross-sectional size upon extension inboard from the lateral midpoint 40 to the second end end 64 in the lateral direction 28, and so that it constantly decreases in cross-sectional size upon extension outboard in the lateral direction 28 from the lateral midpoint 40 to the first end end 60. The farthest portion of the teardrop 32 to the upper surface 16 is at the middle section farthest point of extension 52 and the teardrop 32 continuously extends towards the upper surface 16 from this point 52. The cross-sectional size decreases from the lateral midpoint 70 continuously to the first middle section end 68. The first transition 90 likewise decreases in cross-sectional size continuously from the first middle section end 68 to the first end base 58. In this regard, the cross-sectional shape is circular so the diameter decreases in size upon this extension. The first end 34 is configured in a similar manner as the diameter of the teardrop 32 at the first end continuously decreases in size from the first end base 58 all the way to the first end end 60. The first end farthest point of extension 48 is located at the first end base 58 and does not extend all the way along the entire length 94. The first end end 60 has the smallest diameter of the teardrop 32.

The teardrop 32 extending laterally inboard from the lateral midpoint 40 is symmetric to those sections just discussed that extend laterally outboard from the lateral midpoint 40. The cross-section is circular in shape and decreases in size continually from the lateral midpoint 70 to the second middle section end 72, and this decrease again continues along the entire length 102 of the second transition 92 to the second end base 62. The second end 36 also continuously decreases in diameter from the second end base 62 to the second end end 64 that is the same size as the first end end 60. The entire first and second ends 34, 36 are located closer to the upper surface 16 in the thickness direction 24 than any portion of the middle section 38 which is located in its entirety farther from the upper surface 16 in the thickness direction 24. The teardrop 32 from the first lateral surface 18 thus increases constantly in size to the lateral midpoint 70 at which point it then reverses and decreases constantly in size to the shoulder groove 20.

The various teardrop 32 designs discussed show the sections 34, 36, 38, 90, 92 as constantly increasing or decreasing in size, or in remaining the same size upon extension in the lateral direction 28. However, other embodiments are possible in which the various sections 34, 36, 38, 90, 92 have portions that increase, decrease, or stay the same along their lengths 94, 96, 98, 100, 102 such that the sections 34, 36, 38, 90, 92 can have varying cross-sectional sizes that are the same or different along their lengths 94, 96, 98, 100, 102. There may or may not be noticeable transitions in the surface of the teardrop 32 between the adjacent sections 34, 36, 38, 90, 92 and/or differently sizes portions within the sections 34, 36, 38, 90, 92.

With reference back to FIG. 13, the sipes 22 on the right hand shoulder rib can include teardrops 32 that are configured in any manner previously discussed. The sipes 22 on the right hand shoulder rib differ from those on the left hand shoulder rib 14 in that the bodies 30 and teardrops 32 are oriented at an angle 74 to the lateral direction 28. As a comparison, the two sipes 22 on the left hand shoulder rib 14 extend completely in the lateral direction 28. The angle 74 of the two angled sipes 22 can be from 5-10 degrees, from 10-15 degrees, from 5-20 degrees, from 15-20 degrees, from 20-25 degrees, from 25-30 degrees from 2-7 degrees, from 10-20 degrees, or up to 30 degrees in accordance with various exemplary embodiments. The angle 74 is of both the body 30 and teardrop 32 as measured between their points of engagement from the second lateral surface 19 to the first lateral surface 18, or as measured from their points of engagement from the first lateral surface 18 to the second lateral surface 19. The sipes 22 can thus be variously angled with respect to the lateral direction 28 and are not limited to a specific single angle. All of the sipes 22 of the tread 12 may be oriented at the same angle 74, or the various sipes 22 of the tread 12 may be oriented at different angles 74. Although shoulder notches are not shown in any of the disclosed embodiments, it is to be understood that the first lateral surface 18 could include shoulder notches into which the sipes 22 open.

Figure 18:
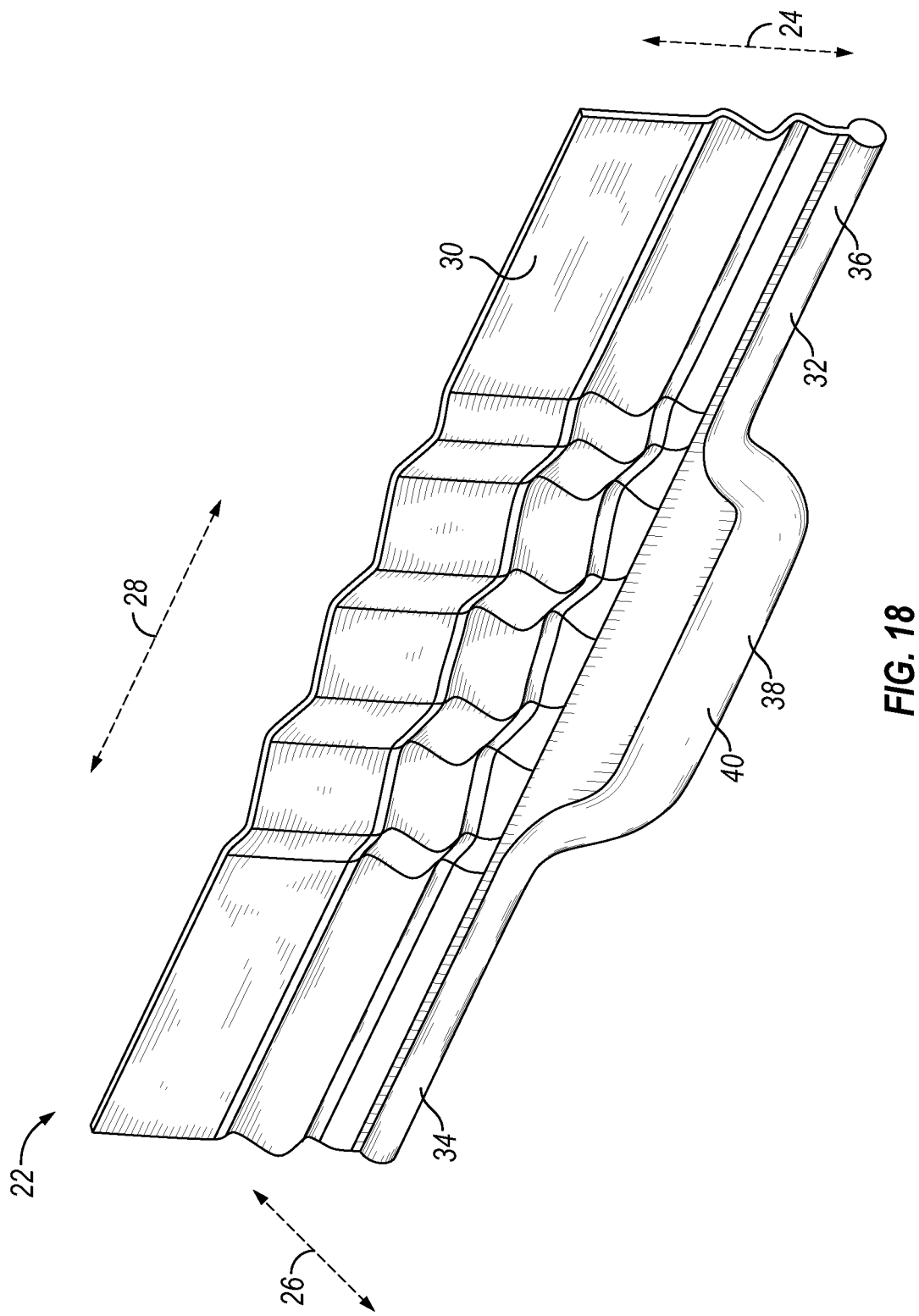
FIG. 18 is a perspective view of a sipe with a teardrop middle section of a greater diameter than ends of the teardrop in accordance with another exemplary embodiment.

FIG. 18 is a perspective view of a sipe 22 that has a teardrop 32 similar to that previously discussed with respect to FIGS. 7 and 8 in which the middle section 38 is larger than the ends 34, 36. The body 30 is shaped differently than that of other embodiments in that it is not just a linear shape, but instead is zig-zag in shape both in the lateral direction 28 of extension and in the thickness direction 24 of extension. The section of the body 30 moving into engagement with the teardrop 32 is linear in shape. However, the zig-zag portions of the body 30 may engage the teardrop 32 along some or all of its lateral length in other embodiments. As such, it is to be understood that the body 30 can be zig-zag in shape in certain areas, or may be completely zig-zag in shape from the upper surface 16 to the teardrop 32 along the entire lateral length. The body 30 may be variously shaped in accordance with different exemplary embodiments.

Figure 19:
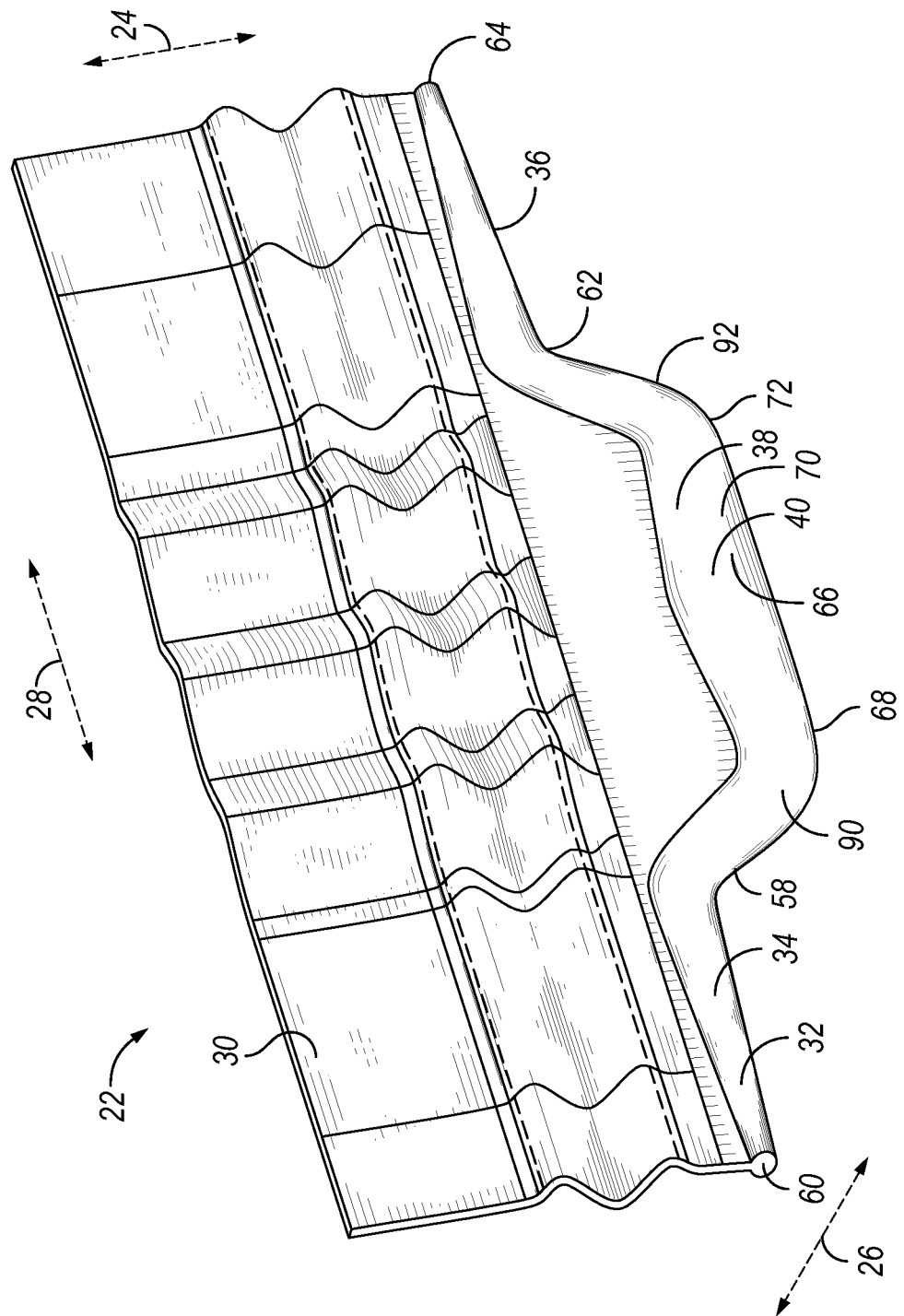
FIG. 19 is a perspective view of a sipe with a teardrop having a middle section and ends that decrease/increase in cross-sectional size upon extension in the lateral direction in accordance with another exemplary embodiment.
Figure 20:
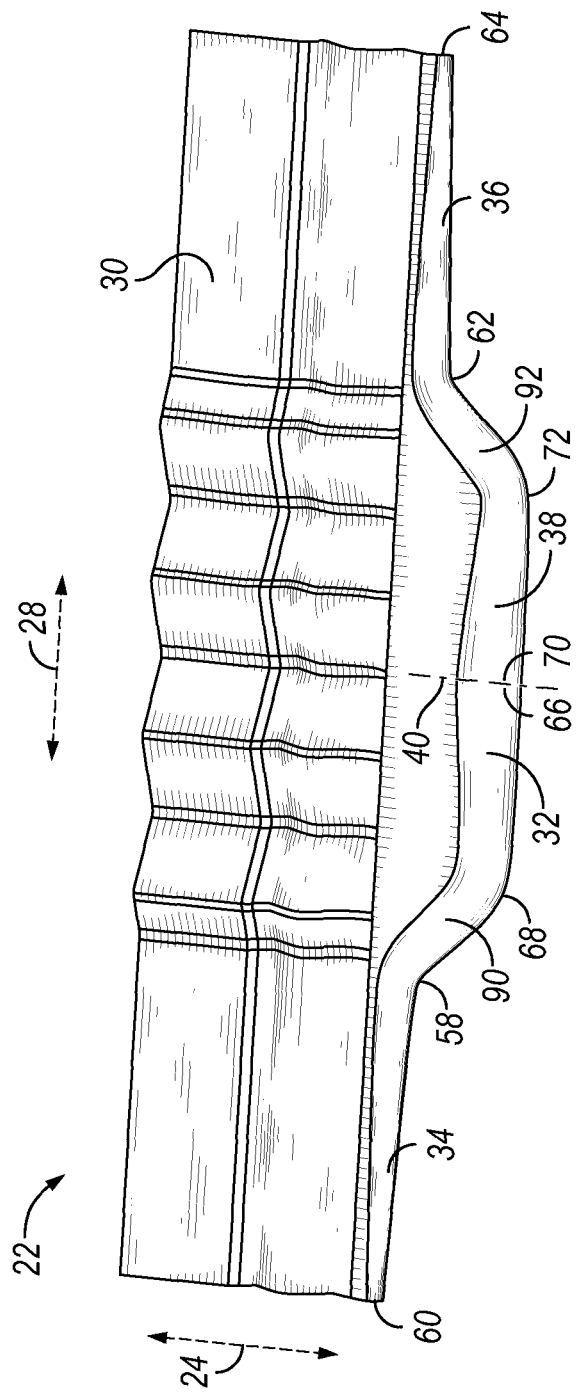
FIG. 20 is a perspective view of the sipe of FIG. 19 taken from a different angle.

FIGS. 19 and 20 show in perspective view the sipe 22 as discussed with reference back to FIGS. 11 and 12 in which the ends 34, 36 are in the shape of truncated cones, and in which the middle section 34 has two truncated cone shapes that extend from the lateral midpoint 40 in the lateral direction 28. The body 30 is zig-zag in shape both in the lateral direction 28 and in the thickness direction 24, although it may only be zig-zag in shape in one of those directions 24, 28 in other embodiments. The zig-zag body 30 may engage the teardrop 32 along some or all of its lateral length, or may be completely spaced from the teardrop 32 so that no portion of the zig-zag body 30 engages the teardrop 32 which is what is shown in FIGS. 19 and 20. Although shown as being a combination of zig-zag shape and linear shape, it is to be understood that various embodiments of the sipe 22 as disclosed herein may have a body 30 of any shape. The zig-zag shape "locks" the rubber making up the shoulder rib 14 together to increase rigidity when this portion of the shoulder rib 14 enters the contact patch.

Figure 6:
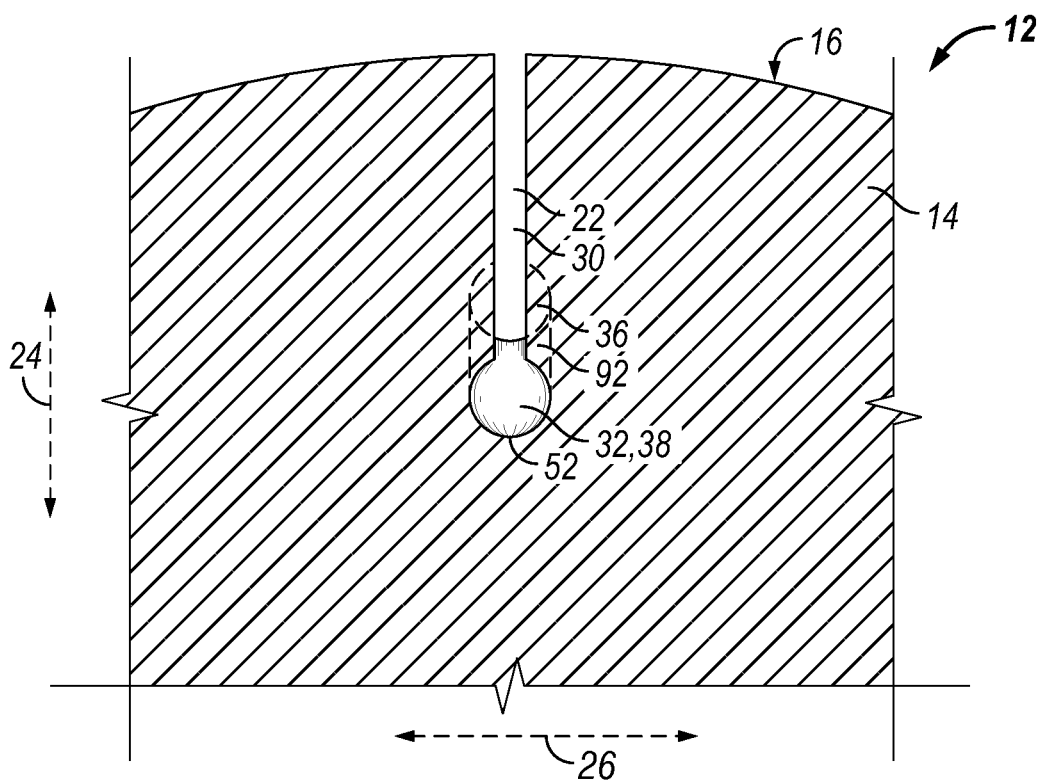
FIG. 6 is cross-section view taken along line 6-6 of FIG. 2.

The FIGS. 4-6 embodiment has the middle section 38 being of the same size as the ends 34, 36. However, other embodiments disclosed have a shape of the teardrop 32 that is greatest at the middle section 38 than at the ends 34, 36 such that it has a greater volume and diameter. The middle section 38 may thus be greater in cross-sectional size than the first end 34 or second end 36. It has been discovered that cracks which may form in the teardrop 32 are more likely to form at the middle of the teardrop 32 and thus in the middle section 38 than at the ends of the teardrop 32 which include the first end 34 and the second end 36. The teardrop 32 will be better protected from tearing since the middle section 32 is larger as the teardrop 32 is most susceptible to tearing at the center of the shoulder rib 14 in the lateral direction 28, and the greater the teardrop 32 is in size in this area will function to reduce the chance of cracks forming at this location. Since the crack is more likely to form and propagate at the middle section 38 than at the ends 34, 36, the first and second ends 34 and 36 can be made smaller than the middle section 38 in cross-sectional size/diameter thus increasing the rigidity of the shoulder rib 14 at the sipe 22 since less rubber is missing from the shoulder rib 14 at the first and second ends 34, 36. By having the ends 34, 36 smaller, the shoulder rib 14 will have more material thus causing it to be more rigid so that the design of the teardrop 32 maintains wear and rolling resistance performance and at the same time reduces cracking and does not require the teardrop 32 be placed closer to the upper surface 16 in the thickness direction 24 so that end of service traction is not impacted.

The presently disclosed sipe 22 in the shoulder rib 14 by having the handlebar shape with the ends 34, 36 closer to the upper surface 16 in the thickness direction 24 than any portion of the middle section 38 is to the upper surface 16 in the thickness direction 24 allows for end of life traction, minimizes the impact to rolling resistance and wear, and minimizes or eliminates cracking within the teardrop 32. The increase in size of the teardrop 32, if present, is put into the locations of the teardrop 32 most likely to experience the cracking which is the middle section 38. The ends 34, 36 could in some embodiments be smaller which increases the rigidity of the shoulder rib 14 at the sipe 22 which minimizes the negative impact upon the rolling resistance and wear characteristics. The solution provided is a combination of both end of life performance and added rigidity in reducing or minimizing the formation of cracking within the sipe 22.

The geometry of the teardrop 32 of the sipe 22 as disclosed allows for end of service traction, minimizes the impact to rolling resistance and wear, and minimizes cracking. The aforementioned geometry helps with tearing of the rubber while still maintaining traction of the tread 12. The sipe 22 can be instead deeper into the tread 12 to get end of life performance, and the sipe 22 geometry maintains rigidity in the tread 12. The larger the teardrop 32 size causes less rubber to be present which leads to a less rigid shoulder rib 14, and the geometry of the disclosed teardrop 32 can prevent this larger void being present. The transitions 90, 92 causes the crack difficulty in moving from the middle section 38 to the ends 34, 36 due to the geometry of the transitions 90, 92 moving upwards/closer to the upper surface 16 in the thickness direction 24 from the middle section 38 to the ends 34, 36. This handlebar geometry could be enhanced by the aforementioned increase in diameter or size of the middle section 38 over the first and section ends 34, 36 to further minimize or prevent crack initiation. Applicant has discovered that the handlebar geometry is effective in preventing or minimizing cracking when the entire first and second ends 34, 36 are closer to the upper surface 16 in the thickness direction 24 than the entire middle section 38 is to the upper surface 16 in the thickness direction 24, such that no portion of the middle section 38 is at the same or closer distance to the upper surface 16 than any part of the first or second ends 34, 36 are to the upper surface 16 in the thickness direction 24.

Although the sipe 22 has been described as being located in the shoulder rib 14, the sipe 22 as described herein can be located in any of the ribs 14 in addition to, or instead of, the shoulder rib 14. As such, the rib 14 into which the herein disclosed sipe is located may be a center rib 14, intermediate rib 14, or any rib of the tread 12. When located into a center rib 14 or an intermediate rib 14, the first and second lateral surfaces 18, 19 are opposite lateral sides of this center rib 14 or intermediate rib 14. The sipe 22 will extend from grooves on opposite lateral sides of the center rib 14 or intermediate rib 14 from one to the other. As such, sipes 22 as disclosed herein could be located in any of one of or all of the rib 14 of the tread 12. In some instances, when sacrificial ribs 54 are present, the sipes 22 may be located in all of the ribs 14 of the tread 12 with the exception of the sacrificial ribs 54.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire tread that has a lateral direction, a thickness direction, and a circumferential direction, comprising:
   a rib having a first lateral surface and a second lateral surface, wherein the rib has an upper surface; and
   a sipe located in the rib that extends from the first lateral surface to the second lateral surface, wherein the sipe has a body and a teardrop, wherein a first end of the teardrop is located at the first lateral surface, wherein a second end of the teardrop is located at the second lateral surface, and wherein the teardrop has a middle section that is located between the first end of the teardrop and the second end of the teardrop in the lateral direction, and wherein a lateral midpoint of the teardrop in the lateral direction is located at the middle section;
   wherein the teardrop has a first transition that is located between the first end and the middle section and extends in both the lateral direction and the thickness direction;
   wherein the teardrop has a second transition that is located between the second end and the middle section and extends in both the lateral direction and the thickness direction;
   wherein the entire middle section is farther from the upper surface in the thickness direction than any portion of the first end is to the upper surface in the thickness direction, and wherein the entire middle section is farther from the upper surface in the thickness direction than any portion of the second end is to the upper surface in the thickness direction;
   wherein a farthest portion of the teardrop to the upper surface in the thickness direction is at the lateral midpoint and continuously extends towards the upper surface upon continuous extension of the teardrop in the lateral direction from the lateral midpoint to the first end wherein a cross-sectional size of the teardrop is smaller at the first end than at the lateral midpoint.

2. The tread as set forth in claim 1, wherein the rib is a shoulder rib, and wherein the tread has a shoulder groove next to the shoulder rib in the lateral direction and wherein the second lateral surface faces the shoulder groove.

3. The tread as set forth in claim 2, wherein the shoulder rib has a plurality of rib grooves that cause the shoulder rib to be arranged as a plurality of shoulder rib blocks.

4. The tread as set forth in claim 2, further comprising a sacrificial rib that is located outboard from the shoulder rib in the lateral direction, and wherein a sacrificial rib groove is located between the shoulder rib and the sacrificial rib in the lateral direction.

5. The tread as set forth in claim 1, wherein the middle section is closest to the upper surface in the thickness direction at the lateral midpoint;
   wherein the middle section of the teardrop has a first middle section truncated cone shape extending outboard from the lateral midpoint in the lateral direction such that a first middle section base is located at the lateral midpoint and a first middle section end engages the first transition;
   wherein the middle section of the teardrop has a second middle section truncated cone shape extending inboard from the lateral midpoint in the lateral direction such that a second middle section base is located at the lateral midpoint and a second middle section end engages the second transition.

6. The tread as set forth in claim 1, wherein the first end of the teardrop is in the shape of a truncated cone having a first end base located inboard in the lateral direction, wherein the first end base engages the first transition;
   wherein the second end of the teardrop is in the shape of a truncated cone having a second end base located outboard in the lateral direction, wherein the second end base engages the second transition.

7. The tread as set forth in claim 1, wherein the body is zig-zag in shape.

8. The tread as set forth in claim 1, wherein the cross-section of the teardrop of the entire middle section is circular in shape, wherein the cross-section of the teardrop of the entire first end is circular in shape, and wherein the cross-section of the teardrop of the entire second end is circular in shape, wherein the cross-section of the teardrop of the entire first transition is circular in shape, and wherein the cross-section of the teardrop of the entire second transition is circular in shape.

9. The tread as set forth in claim 1, wherein the teardrop extending in the lateral direction from the lateral midpoint to the first lateral surface continuously decreases in cross-sectional size from the lateral midpoint to the first lateral surface;
   wherein the teardrop extending in the lateral direction from the lateral midpoint to the second lateral surface continuously decreases in cross-sectional size from the lateral midpoint to the second lateral surface.

10. The tread as set forth in claim 1, wherein the sipe is angled from 5 degrees to 20 degrees relative to the lateral direction upon extension from the first lateral surface to the second lateral surface.

11. A heavy truck tire tread that has a lateral direction, a thickness direction, and a circumferential direction, comprising:
- a rib having a first lateral surface and a second lateral surface, wherein the rib has an upper surface; and
- a sipe located in the rib that extends from the first lateral surface to the second lateral surface, wherein the sipe has a body and a teardrop, wherein a first end of the teardrop is located at the first lateral surface, wherein a second end of the teardrop is located at the second lateral surface, and wherein the teardrop has a middle section that is located between the first end of the teardrop and the second end of the teardrop in the lateral direction, and wherein a lateral midpoint of the teardrop in the lateral direction is located at the middle section;

wherein the teardrop has a first transition that is located between the first end and the middle section and extends in both the lateral direction and the thickness direction;

wherein the teardrop has a second transition that is located between the second end and the middle section and extends in both the lateral direction and the thickness direction;

wherein the entire middle section is farther from the upper surface in the thickness direction than any portion of the first end is to the upper surface in the thickness direction, and wherein the entire middle section is farther from the upper surface in the thickness direction than any portion of the second end is to the upper surface in the thickness direction;

wherein the first end and the second end have cross-sections that are circular in shape with the same diameter along entire lengths of the first end and the second end;

wherein the middle section has a cross-section that is circular in shape with the same diameter along an entire length of the middle section, wherein the diameter of the middle section is greater than the diameter of the first end and second end;

wherein the first transition and the second transition have cross-sections that are circular in shape with varying diameters along entire lengths of the first and second transitions.

\* \* \* \* \*